(12) United States Patent
Bhopte et al.

(10) Patent No.: US 10,243,185 B2
(45) Date of Patent: Mar. 26, 2019

(54) BATTERY ENCLOSURES IN ELECTRONIC DEVICES

(71) Applicant: Microsoft Technology Licensing, LLC, Redmond, WA (US)

(72) Inventors: Siddharth Bhopte, Redmond, WA (US); Minsoo Kim, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/640,162

(22) Filed: Jun. 30, 2017

(65) Prior Publication Data

US 2019/0006649 A1    Jan. 3, 2019

(51) Int. Cl.
*H01M 2/10* (2006.01)
*H01M 10/6551* (2014.01)
*H01M 10/48* (2006.01)
*H01M 10/6571* (2014.01)
*H01M 10/623* (2014.01)
*G06F 1/18* (2006.01)

(52) U.S. Cl.
CPC ............ *H01M 2/1094* (2013.01); *G06F 1/18* (2013.01); *H01M 10/486* (2013.01); *H01M 10/623* (2015.04); *H01M 10/6551* (2015.04); *H01M 10/6571* (2015.04); *H01M 2220/30* (2013.01)

(58) Field of Classification Search
CPC combination set(s) only.
See application file for complete search history.

(56) References Cited

U.S. PATENT DOCUMENTS 5,338,624 A * 8/1994 Gruenstern ......... H01M 2/0207
429/120
6,815,123 B2 11/2004 Sun
7,887,941 B2 * 2/2011 Horikoshi ............ G06F 1/1632
429/110

(Continued)

FOREIGN PATENT DOCUMENTS

CN       103138482 A     6/2013
EP         2946425 A1    11/2015
WO      2015113133 A1     8/2015

OTHER PUBLICATIONS

Jacoby, Mitch, "This Heat-Responsive Coating Could Keep Lithium-Ion Batteries From Catching Fire", In Publication of Chemical & Engineering News, vol. 94, Issue 3, Jan. 2016, 3 pages.

(Continued)

*Primary Examiner* — Lisa Lea-Edmonds
(74) *Attorney, Agent, or Firm* — NovoTechIP International PLLC

(57) ABSTRACT

Battery enclosures and electronic devices having a battery enclosure are described herein. In one example, a battery enclosure includes a shell, a battery positioned within an internal volume of the shell, and a fire-retardant composition positioned on an outer surface of the shell, a first inner surface of the shell, between the first inner surface of the shell and the battery, or a combination thereof. In certain examples, the shell and/or fire-retardant composition are configured to provide a thermal seal or protection barrier between components (e.g., a battery) positioned within the battery enclosure and components of the electronic device positioned outside of the battery enclosure.

17 Claims, 4 Drawing Sheets

(56) References Cited

U.S. PATENT DOCUMENTS

| | | | |
|---|---|---|---|
| 7,916,487 B2* | 3/2011 | Bitton | G06F 21/70 |
| | | | 174/50 |
| 8,097,356 B2* | 1/2012 | Horikoshi | G06F 1/1632 |
| | | | 429/110 |
| 8,367,233 B2 | 2/2013 | Hermann et al. | |
| 8,570,719 B2* | 10/2013 | Cleveland | G11B 33/1406 |
| | | | 220/62.11 |
| 8,587,939 B2* | 11/2013 | McClure | G06F 1/1626 |
| | | | 312/223.1 |
| 8,605,414 B2* | 12/2013 | Moore | G06F 1/182 |
| | | | 361/679.02 |
| 9,012,062 B2 | 4/2015 | Smith et al. | |
| 9,508,970 B2 | 11/2016 | Jones et al. | |
| 2008/0220320 A1* | 9/2008 | Horikoshi | G06F 1/1632 |
| | | | 429/82 |
| 2011/0091751 A1* | 4/2011 | Horikoshi | G06F 1/1632 |
| | | | 429/53 |
| 2013/0146603 A1 | 6/2013 | Brilmyer | |
| 2014/0154535 A1 | 6/2014 | Olsson et al. | |
| 2016/0093842 A1 | 3/2016 | Blanco et al. | |
| 2016/0319125 A1* | 11/2016 | Hyun | C08L 69/00 |
| 2017/0025646 A1 | 1/2017 | Ota et al. | |
| 2017/0033327 A1* | 2/2017 | Tajima | H01M 2/0212 |
| 2017/0203135 A1* | 7/2017 | Cordani | A62D 1/0007 |
| 2017/0237054 A1* | 8/2017 | Mast | B65D 25/02 |
| | | | 320/107 |
| 2017/0250554 A1* | 8/2017 | Tajima | A44C 5/0053 |

OTHER PUBLICATIONS

Kai Liu et al., "Electrospun core-shell microfiber separator with thermal-triggered flame-retardant properties for lithium-ion batteries," Science Advances, vol. 3, pp. 1-8 (Jan. 13, 2017).

Alice Klein, "Mini fire extinguishers inside lithium batteries may stop blazes," Daily News, Jan. 13, 2017.

"International Search Report & Written Opinion for PCT Patent Application No. PCT/US18/034500", dated Nov. 19, 2018, 17 Pages.

* cited by examiner

BATTERY ENCLOSURES IN ELECTRONIC DEVICES

BACKGROUND

Current design trends for electronic devices such as tablet computers, display devices, or mobile phones include designs having an increase in power, a decrease in size (e.g., height, length, and/or width), and an increase in speed. As the size of the electronic device is reduced, certain internal device components may be positioned closer together. This provides for challenges in manufacturing design.

Further, as microprocessors become lighter, smaller, and more powerful, they also generate more heat in a smaller space, making thermal management a greater concern than before.

The purpose of thermal management is to maintain the temperature of a device within a moderate range and protect internal device components (e.g., a battery) from operational stress such as heat, shock, vibration, or other physical damage. Failure of the battery may cause the device to become inoperable or expose the user to a safety hazard such as electrolyte leakage, explosion, fire, or other physical harm.

SUMMARY

Battery enclosures and electronic devices having a battery enclosure are described herein. In one or more embodiments, a battery enclosure, configured to be positioned within an electronic device, includes a shell; a battery positioned within an internal volume of the shell; and a fire-retardant composition positioned on an outer surface of the shell, a first inner surface of the shell, between the first inner surface of the shell and the battery, or a combination thereof.

In another embodiment, an electronic device includes a housing; a motherboard positioned within the housing; and a battery enclosure positioned within the housing. The battery enclosure includes a shell having an outer surface, an inner surface, and an internal volume; an opening in the shell; and a battery positioned within the internal volume of the shell, wherein the battery is connected to the motherboard via a connector cable running through the opening in the shell, wherein the shell is configured to provide a thermal protection barrier between the battery and components of the electronic device positioned outside of the battery enclosure.

In another embodiment, a battery enclosure, configured to be positioned within an electronic device, includes a shell; a battery positioned within an internal volume of the shell; and a fire-retardant composition positioned within the internal volume of the shell, wherein the shell and the fire-retardant composition are configured to provide a thermal protection barrier between the battery and components of the electronic device positioned outside of the battery enclosure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
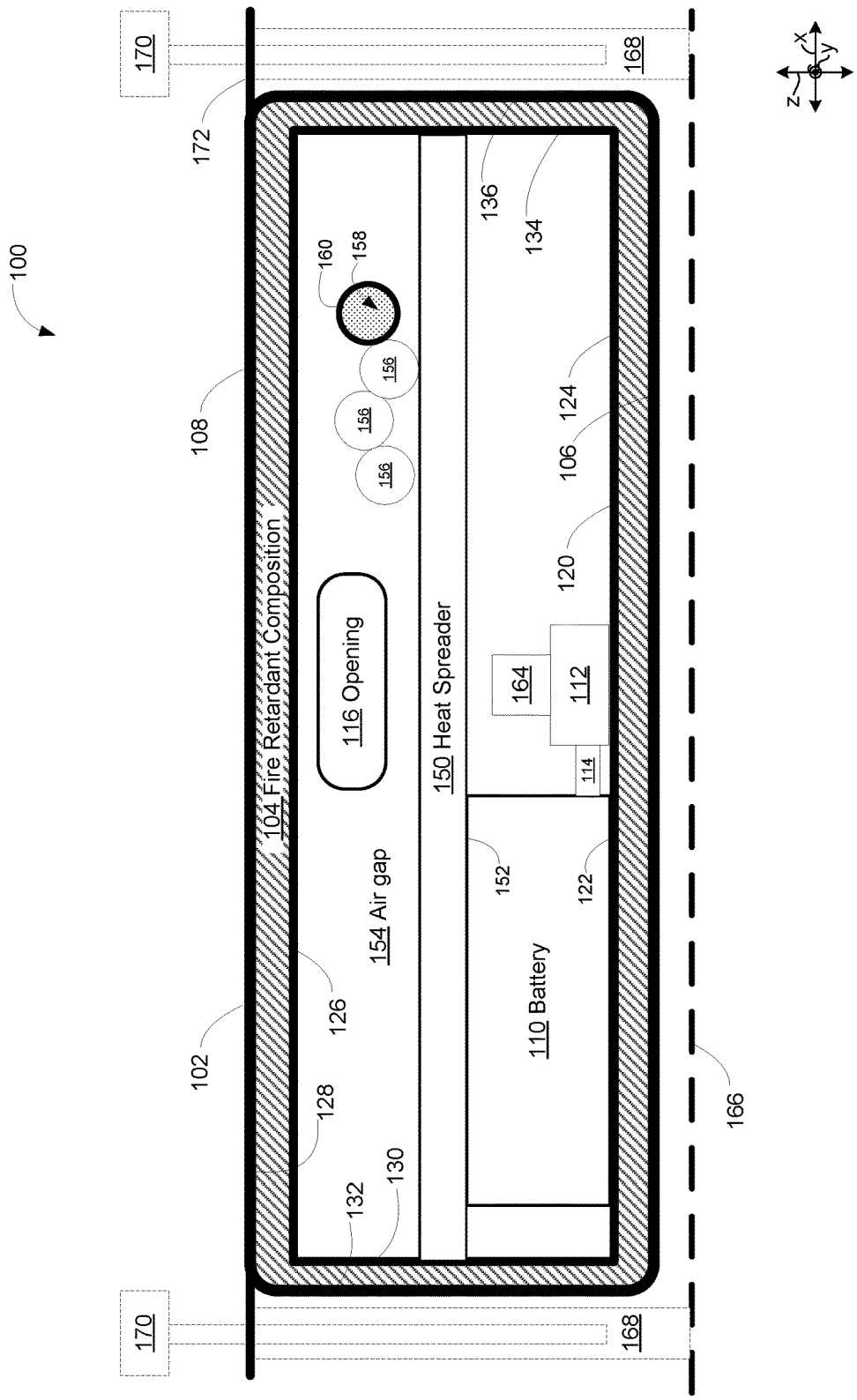
FIG. 1 depicts an example of a cross-sectional side view of a battery enclosure.

While the disclosed devices and systems are representative of embodiments in various forms, specific embodiments are illustrated in the drawings (and are hereafter described), with the understanding that the disclosure is intended to be illustrative, and is not intended to limit the claim scope to the specific embodiments described and illustrated herein.

DETAILED DESCRIPTION

As used herein, a "battery enclosure" may refer a device having a shell or outer case configured to secure or protect at least one battery positioned within an internal volume of the shell or outer case. In certain examples, the battery enclosure may refer to a device that provides a thermal seal or thermal protection barrier that restricts or eliminates the flow of heat from the internal volume of the shell to the volume located outside of the shell (or from outside of the shell to the internal volume of the shell).

Battery enclosures and electronic devices having battery enclosures are disclosed herein. Such battery enclosures have several potential end-uses or applications, including protecting a battery from external damage, preventing the battery from overheating during nominal operation, protecting the electronic device and an end-user of the device from a battery fire or leak, and/or enhancing the performance or extending the life of a battery.

The battery enclosure may be incorporated into any electronic device at least partially powered by a battery. Non-limiting examples of electronic devices include personal computers (PCs), server computers, tablet and other handheld computing devices, laptop or mobile computers, communication devices such as mobile phones, multiprocessor systems, microprocessor-based systems, set top boxes, programmable consumer electronics, network PCs, minicomputers, mainframe computers, or audio or video media players. In certain examples, the electronic device may be a wearable electronic device, wherein the device may be worn on or attached to a person's body or clothing. The wearable device may be attached to a person's shirt or jacket; worn on a person's wrist, ankle, waist, or head; or worn over their eyes or ears. Such wearable devices may include a watch, heart-rate monitor, activity tracker, or head-mounted display.

Various non-limiting examples of battery enclosures and electronic devices including battery enclosures are described in greater detail below.

Figure 2:
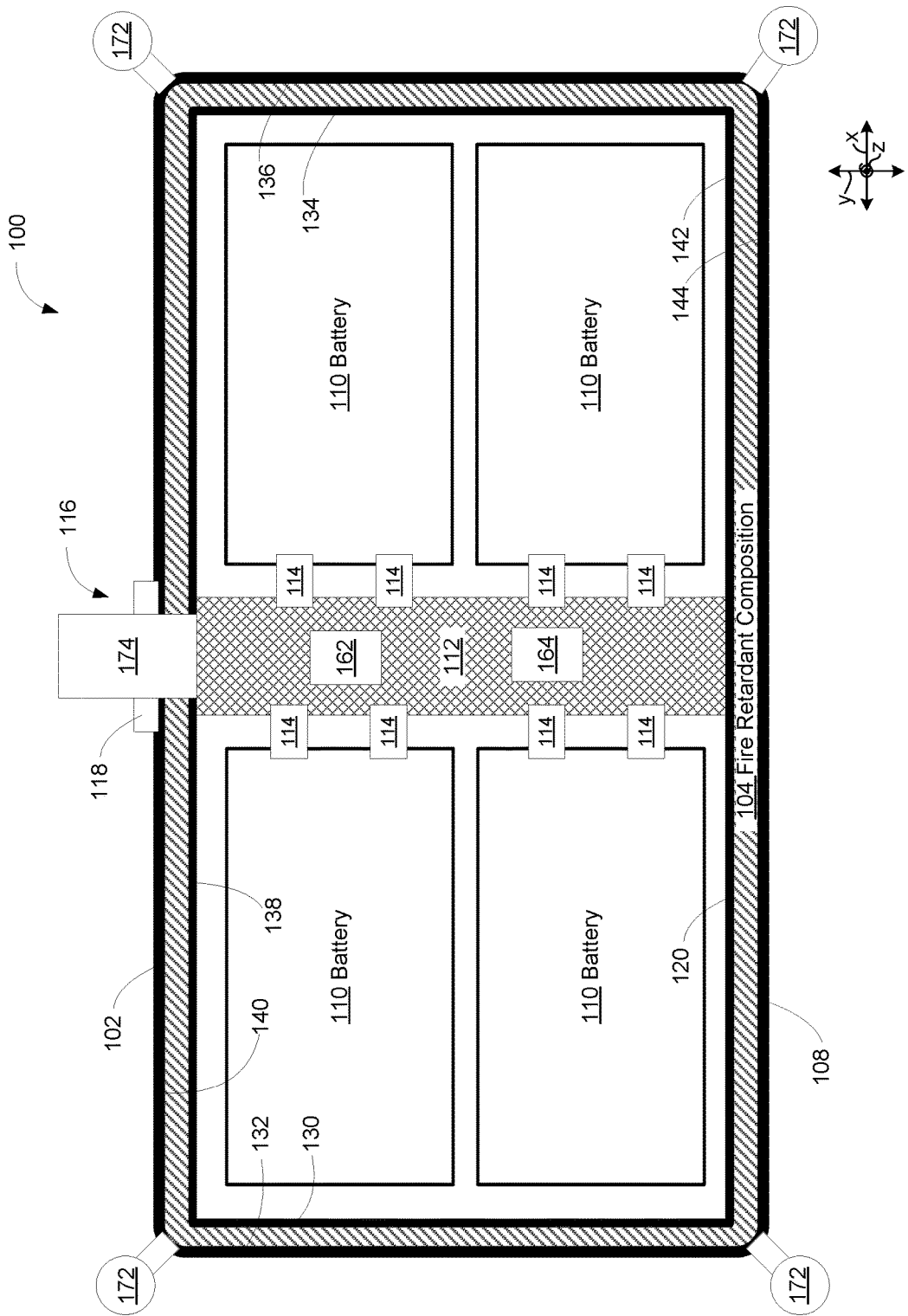
FIG. 2 depicts a top-down view of the battery enclosure of FIG. 1.

FIGS. 1 and 2 depict an example of a battery enclosure 100. FIG. 1 depicts a cross-sectional side view of a battery enclosure 100, while FIG. 2 depicts a top-down view of the same battery enclosure 100. The battery enclosure 100 includes a shell or outer case 102 providing a protective external shield or covering to one or more components included within the internal volume of the enclosure 100.

The shell 102 may be made of any material configured to contain a fire or explosion caused by a component (e.g., a battery) within the enclosure 100. This is advantageous in containing damage to the components within the enclosure 100, while protecting the remaining components in the electronic device positioned outside of the enclosure 100. In certain examples, the shell 102 may provide a thermal seal or thermal protection barrier between the internal volume of the shell and the volume of the electronic device located outside of the shell. The thermally sealed battery enclosure may reduce or eliminate the flow of heat from the internal volume of the shell to the volume located outside of the shell. Alternatively, or additionally, the thermally sealed battery enclosure may reduce or eliminate the flow of heat from outside of the shell to the internal volume of the shell.

In some examples, the shell 102 is a composition (e.g., a metallic or polymeric composition) having a melting point greater than 300° C., 400° C., 500° C., 600° C., 700° C., 800° C., 900° C., or 1000° C. The shell 102 may include one or more metals or metal alloys such as aluminum, copper, iron, lead, magnesium, molybdenum, nickel, osmium, palladium, platinum, rhenium, rhodium, ruthenium, sliver, steel, tantalum, thorium, titanium, vanadium, or alloys thereof.

The dimensions of the shell 102 are configurable based on the type of electronic device in which the battery enclosure 100 is installed, as well as the power requirements of the electronic device. In some examples, the shell 102 may have a length (as measured along the x-axis) of 0.1-5000 mm, 1-2000 mm, 10-1000 mm, 50-500 mm, or 100-500 mm. The shell 102 may have a width (as measured along the y-axis) of 0.1-5000 mm, 1-2000 mm, 10-1000 mm, 50-500 mm, or 100-500 mm. The shell 102 may have a height (as measured along the z-axis of 0.1-500 mm, 1-100 mm, 5-50 mm, 10-50 mm, or 5-20 mm.

The battery enclosure 100 may include a flame retardant or fire-retardant composition 104. The fire-retardant composition 104 is configured to reduce the flammability of a battery fire or delay the combustion of a battery fire. The fire-retardant composition 104 may be a chemical agent, foam, gel, fabric, plastic, coating, surface finish, or other material that is chemically treated to be slow burning or self-extinguishing when exposed to an open flame. The fire-retardant composition 104 may be mixed with a base material (e.g., an additive fire-retardant) or chemically bonded to the base material (e.g., a reactive fire-retardant). Such a fire-retardant composition is advantageous in preventing a battery fire from occurring, containing a battery fire within a certain area of the electronic device, or limiting potential damage from a battery fire to other components of an electronic device.

The fire-retardant composition 104 may include mineral compounds such as aluminum hydroxide, magnesium hydroxide, huntite and hydromagnesite, hydrate compositions, red phosphorus, boron compositions, or borate compositions. In some examples, the fire-retardant composition 104 includes an organohalogen such as organocholorines (e.g., chlorendic acid derivatives and chlorinated paraffin), organobromines (e.g., decabromodiphenyl ether), decabromodiphenyl ethane, polymeric brominated compounds (e.g., brominated polystyrenes, brominated carbonate oligomers, brominated epoxy oligomers, tetrabromophthalic anhydride, tetrabromobisphenol A, or hexabromocyclododecane). In other examples, the fire-retardant composition 104 includes an organophosphorus compound such as organophosphates (e.g., triphenyl phosphate, resorcinol bis(diphenylphosphate), bisphenol A diphenyl phosphate, or tricresyl phosphate), phosphonates (e.g., dimethyl methylphosphonate); or phosphinates (e.g., aluminum diethyl phosphinate). In certain examples, the fire-retardant composition 104 includes more than one fire-retardant compound (e.g., the composition includes both a phosphorus compound and a halogen compound).

The fire-retardant composition 104 may be included within a layer of material positioned adjacent to or abutting the shell 102. In some examples, the fire-retardant composition 104 is a paint layer or coating applied to one or more surfaces of the shell 102. For example, the fire-retardant composition 104 may be applied to at least one inner surface 106 of the shell 102 (e.g., as a paint layer that coats a portion or the entire inner surface of the shell). In other examples, the fire-retardant composition 104 may be applied to at least one outer surface 108 of the shell 102. In yet other examples, the fire-retardant composition 104 may be positioned adjacent to or abutting one or more internal components of the battery enclosure 100 (e.g., as a paint layer coating a surface of a battery or heat spreader). In yet other examples, the fire-retardant composition 104 may be positioned to fill a volume between an inner surface 106 of the shell 102 and an internal component of the battery enclosure 100 (e.g., a battery or heat spreader). In some examples, the fire-retardant composition 104 may be positioned in multiple locations (e.g., both on the internal and external surfaces of the shell).

The battery enclosure 100 may include one or more batteries 110. The battery 110 may be any type of battery now known or latter developed. In certain examples, the battery is a secondary or rechargeable battery. Non-limiting examples include lead-acid, nickel cadmium, nickel-metal hydride, lithium-ion, lithium-ion polymer, lithium-sulfur, sodium-ion, sodium-sulfur, silver-zinc, zinc-bromide, zinc-cerium, zinc-air, or molten-salt batteries.

The one or more batteries 110 may be attached to a protection circuit module 112 positioned within the enclosure 100 via one or more battery cell tabs 114. The protection circuit module 112 may be connected to a connector cable that extends outside of the battery enclosure 100 via an opening 116 in the shell 102 of the battery enclosure 100. A seal 118 (e.g., a hermetic seal) may be positioned around the cable extending through the opening 116 of the shell 102. This may be advantageous in preventing an electrolyte leak or fire from escaping through the opening or cutout 116 in the shell 102 of the battery enclosure 100 in the event of a battery fire or explosion.

The battery enclosure 100 may include at least one heat spreader. Heat spreaders are advantageous in dissipating heat from one or more hot spots created within the battery enclosure 100 over a larger area. A heat spreader may be an individual piece of thermally conductive material. In other examples, the heat spreader includes a plurality of thermally conductive segments of material that are connected or joined together. The segments may be connected by soldering or sintering the segments together. In other examples, the segments may be connected through use of an intermediate adhesive layer. In yet other examples, the segments may be connected by affixing a portion of a surface of one segment against a surface of the second segment (e.g., without any adhesive or bonding).

As depicted in FIGS. 1 and 2, a first heat spreader 120 is provided within the battery enclosure 100. The first heat spreader 120 may be positioned between the battery 110 and inner surface of the shell 102). For example, the first heat spreader 120 may be positioned adjacent to or abutting one or more surfaces of a battery 110. This is advantageous in dissipating heat generated from one or more areas of the battery 110. Additionally, the first heat spreader 120 may be advantageous in warming the battery 110 in conjunction with a resistive heater integrated circuit (discussed in greater detail below).

The first heat spreader 120 may be adhered to a first surface 122 of the battery 110 via an adhesive layer. Alternatively, the first heat spreader 120 may abut the first surface 122 of the battery 110 without an intermediate adhesive layer.

Additionally, or alternatively, the first heat spreader 120 may be positioned adjacent to or abutting the fire-retardant composition 104. In such an example, the first heat spreader 120 may be adhered to the fire-retardant composition 104 via an adhesive layer. Alternatively, the first heat spreader 120 may abut the fire-retardant composition 104 without an intermediate adhesive layer (e.g., the fire-retardant composition 104 may be applied as a paint layer to a surface of the first heat spreader 120).

To the extent an adhesive layer is provided, the adhesive layer may include one or more pressure-sensitive adhesive materials. Additional or alternative types of adhesive materials and films may be used, including, for instance, moisture or thermally cured adhesive materials. The adhesive materials may be silicone-based, epoxy-based, and/or acrylic-based materials. In certain examples, the adhesive layer may be an acrylic resin or an optically clear adhesive (OCA). The height or thickness of the adhesive layer is configurable as well. In some examples, the height of the adhesive layer is in a range from 0.1-50 micrometers (μm), 0.1-10 μm, 0.1-5 μm, or 1-5 μm.

In certain examples, the first heat spreader 120 may surround a fraction of the perimeter of the battery 110 or the entire perimeter of the battery 110. As depicted in FIGS. 1 and 2, the first heat spreader 120 surrounds the entire perimeter of the one or more batteries 110, enclosing each battery within the internal volume formed by the first heat spreader 120. The first heat spreader 120 has a first segment 124 positioned between the battery 110 and a first inner surface 106 of the shell, a second segment 126 positioned between the battery 110 and a second inner surface 128 of the shell, a third segment 130 positioned between the battery 110 and a third inner surface 132 of the shell, a fourth segment 134 positioned between the battery 110 and a fourth inner surface 136 of the shell, a fifth segment 138 positioned between the battery 110 and a fifth inner surface 140 of the shell, and a sixth segment 142 positioned between the battery 110 and a sixth inner surface 144 of the shell. As noted above, the multiple segments of the first heat spreader 120 may be soldered, sintered, adhered, or otherwise affixed together.

The first heat spreader 120 may be a thermally conductive material such as a polymer or metal composition. The thermally conductive material may have a high thermal conductivity (e.g., a thermal conductivity greater than 100 W/(m·K), 150 W/(m·K), 200 W/(m·K), 300 W/(m·K), or 400 W/(m·K)). In some examples, the heat spreader material includes a metal such as copper, aluminum, gold, silver, tungsten, or an alloy thereof. In other examples, the heat spreader material includes graphite. In yet other examples, the heat spreader material includes one or more thermoplastic polymer compositions such as acrylics (e.g., poly(methyl methacrylate)), terpolymers (e.g., acrylonitrile butadiene styrene), polyamides (e.g., nylon), aliphatic polyesters (e.g., polylactic acid), polybenzimidazole, polycarbonates, polyether sulfone, polyether ether ketone, polyetherimide, polyethylene, polyethylene oxide, polyethylene terephthalate, polyphenylene oxide, polyphenylene sulfide, polypropylene, polystyrene, polyvinyl chloride, polyvinyl fluoride, or polytetrafluoroethylene, polymethylene oxide, polytetramethylene oxide, polymethylpentene, polymethyl methacrylate, polycaprolactam, polyacrylonitrile, polybutene, polybutadiene, polyvinyl alcohol, polyvinylidene chloride, or polyvinylidene fluoride.

The dimensions or size of the first heat spreader 120 are configurable based on the dimensions of the battery 110 or batteries within the battery enclosure 100. In some examples, the length (as measured along the x-axis) of a segment of the first heat spreader 120 may be equal to or greater than the length of the battery 110 or combined lengths of batteries as measured along the same axis. The width (as measured along the y-axis) of the same segment of the first heat spreader 120 may be equal to or greater than the length of the battery 110 or combined lengths of batteries as measured along the same axis. In some examples, the length and width of the segment of the first heat spreader 120 is 0.1-5000 mm, 1-2000 mm, 10-1000 mm, 50-500 mm, or 100-500 mm. The height or thickness (as measured along the z-axis) of the segment of the first heat spreader 120 may be 1-5000 micrometers (μm), 10-1000 μm, or 100-500 μm.

A second heat spreader 150 may also be provided within the battery enclosure 100. The second heat spreader 150 may be positioned between the battery 110 and a second inner surface of the shell 102). For example, the second heat spreader 150 may be positioned adjacent to or abutting one or more surfaces of a battery 110. This is advantageous in dissipating heat generated from one or more areas of the battery 110. Additionally, the second heat spreader 150 may be advantageous in warming the battery 110 in conjunction with a resistive heater integrated circuit (discussed in greater detail below).

The second heat spreader 150 may be adhered to a second surface 152 of the battery 110 via an adhesive layer. Alternatively, the second heat spreader 150 may abut the second surface 152 of the battery 110 without an intermediate adhesive layer.

The second heat spreader 150 may be a thermally conductive material such as a polymer or metal composition. The thermally conductive material may be a same or different material as the first heat spreader material. The thermally conductive material of the second heat spreader 150 may have a high thermal conductivity (e.g., a thermal conductivity greater than 100 W/(m·K), 150 W/(m·K), 200 W/(m·K), 300 W/(m·K), or 400 W/(m·K)). Examples of thermally conductive materials are discussed above with reference to the first heat spreader.

The dimensions or size of the second heat spreader 150 are configurable based on the dimensions of the battery 110 or batteries within the battery enclosure 100. For instance, the second heat spreader 150 may be configured to extend lengthwise (as measured along the x-axis) and widthwise (as measured along the y-axis) such that the perimeter of the second heat spreader 150 abuts internal surfaces of the first heat spreader 120.

In some examples, the length (as measured along the x-axis) of the second heat spreader 150 may be equal to or greater than the length of the battery 110 or combined lengths of batteries as measured along the same axis. The width (as measured along the y-axis) of the second heat spreader 150 may be equal to or greater than the length of the battery 110 or combined lengths of batteries as measured along the same axis. In some examples, the length and width of the second heat spreader 150 is 0.1-5000 mm, 1-2000 mm, 10-1000 mm, 50-500 mm, or 100-500 mm. The height or thickness (as measured along the z-axis) of the second heat spreader 150 may be 1-5000 micrometers (μm), 10-2000 μm, 100-1000 μm, 10-1000 μm, 200-1000 μm, or 100-500 μm.

As depicted in FIG. 1, an air gap 154 is provided within the battery enclosure 100. The air gap 154 refers to a cavity or air space within the battery enclosure 100, which may be advantageous in controlling heat transfer within the battery enclosure 100 via conduction, convection, and/or radiation.

The dimensions or size of the air gap 154 are configurable based on the dimensions of the battery 110 or batteries within the battery enclosure 100. In some examples, the air gap 154 may be configured to extend lengthwise (as measured along the x-axis) and widthwise (as measured along the y-axis) such that the perimeter of the air gap 154 abuts internal surfaces of the first heat spreader 120. The height or thickness (as measured along the z-axis) of air gap 154 may be 0.01-10 mm, 0.1-1 mm, 0.1-0.5 mm, 0.5-1 mm, or 0.2-0.5 mm.

In certain examples, fire-retardant capsules 156 may be positioned within the volume of the air gap 154. In certain examples, the fire-retardant capsules 156 include one or more fire-retardant compositions 158 (e.g., oxygen starving compounds) encased within a polymeric or plastic coating 160. The polymer coating material may be any composition or material configured to melt at a temperature greater than the operating limit of the electronic device (e.g., greater than 50° C.). In some examples, the coating 160 may be configured to melt at a temperature greater than 50° C., 100° C., 150° C., or 200° C., or at a temperature between 50-200° C., 50-150° C., 50-100° C., 100-200° C., 100-150° C., or 150-200° C. This is advantageous in releasing the fire-retardant composition 158 (e.g., the oxygen starving materials) only in a situation where the operating temperature of the electronic device has been exceeded (i.e., when there is a suspected unstable temperature condition within the enclosure 100, such as a battery fire) but at a low enough temperature that a potential thermal runaway or battery fire may still be contained.

Nonlimiting examples of polymer coatings 160 include one or more thermoplastic polymer compositions such as acrylics (e.g., poly(methyl methacrylate)), terpolymers (e.g., acrylonitrile butadiene styrene), polyamides (e.g., nylon), aliphatic polyesters (e.g., polylactic acid), polybenzimidazole, polycarbonates, polyether sulfone, polyether ether ketone, polyetherimide, polyethylene, polyethylene oxide, polyethylene terephthalate, polyphenylene oxide, polyphenylene sulfide, polypropylene, polystyrene, polyvinyl chloride, polyvinyl fluoride, or polytetrafluoroethylene, polymethylene oxide, polytetramethylene oxide, polymethylpentene, polymethyl methacrylate, polycaprolactam, polyacrylonitrile, polybutene, polybutadiene, polyvinyl alcohol, polyvinylidene chloride, or polyvinylidene fluoride.

The fire-retardant composition 158 contained within the polymeric coating 160 may be a same or different composition as the fire-retardant composition described above. In some examples, the fire-retardant composition 158 contained within the coating 160 includes a mineral such as aluminum hydroxide, magnesium hydroxite, huntite and hydromagnesite, hydrate compositions, red phosphorus, boron compositions, or borate compositions. In some examples, the fire-retardant composition 158 includes an organohalogen such as organocholorines (e.g., chlorendic acid derivatives and chlorinated paraffin), organobromines (e.g., decabromodiphenyl ether), decabromodiphenyl ethane, polymeric brominated compounds (e.g., brominated polystyrenes, brominated carbonate oligomers, brominated epoxy oligomers, tetrabromophthalic anyhydride, tetrabromobisphenol A, or hexabromocyclododecane). In other examples, the fire-retardant composition 158 within the coating 160 includes an organophosphorus compound such as organophosphates (e.g., triphenyl phosphate, resorcinol bis(diphenylphosphate), bisphenol A diphenyl phosphate, or tricresyl phosphate), phosphonates (e.g., dimethyl methylphosphonate); or phosphinates (e.g., aluminum diethyl phosphinate).

The dimensions of the fire-retardant capsules 156 are configurable based on the dimensions of the air gap 154. In one example, the capsules 156 are spherical, cylindrical, oval shaped, cube shaped, or cuboid shaped. The largest length or diameter of each capsule 156 may be 0.1-100 μm, 1-50 μm, 1-10 μm, or 5-50 μm.

The capsules 156 containing the fire-retardant composition may occupy a fraction of the overall volume of the air gap 154. In some examples, the capsules 156 take up 0.1-50 percent by volume (vol %), 1-25 vol %, or 5-10 vol % of the air gap 154.

The capsules 156 having the fire-retardant composition may be positioned anywhere within the air gap 154. In some examples, the capsules 156 are affixed to a surface of the first heat spreader 120 and/or second heat spreader 150 (e.g., via an intermediate adhesive material). In other examples, the capsules 156 are free flowing within the volume of the air gap 154.

In certain examples, a thermistor 162 and resistor heater integrated circuit (IC) 164 may be provided within the battery enclosure 100. The thermistor 162 is an electrical resistor or sensor configured to monitor the temperature within the battery enclosure 100. The resistor heater IC 164 may be configured to activate or turn on (e.g., a current may be provided to the IC) based on the observed temperature by the thermistor 162 (e.g., when the observed temperature is lower than ambient temperature conditions (20-25° C.)). This arrangement is advantageous in extending battery life, improving battery performance, and/or preventing battery degradation during charging by avoiding adversely cold temperature conditions. For example, if the observed temperature within the battery drops below 20° C., 15° C., 10° C., or 5° C., the resistor heater IC 164 may be activated to warm up the battery enclosure 100 to a reasonable operating temperature (e.g., 20-30° C.).

The resistor heater IC 164 may be positioned near, adjacent to, or abutting at least one heat spreader. This is advantageous in warming a surface of the heat spreader, and, as a result, warming the adjacent or abutting surface of the battery 110.

The battery enclosure 100 may include one or more securing elements to secure the battery enclosure 100 to an internal surface of the electronic device (e.g., the internal surface of the chassis, bucket, or housing 166 of the electronic device). The securing elements are advantageous in preventing the battery enclosure 100 (and its internal components) from being damaged during movement of the electronic device. For example, the securing elements are advantageous in minimizing exposure of the battery enclosure 100 (and its internal components) to mechanical stresses during the manufacturing of the electronic device, shipping, handling, and nominal use. In some examples, the securing elements are advantageous in absorbing or dampening any shock or vibration to the battery enclosure 100.

In one example, the securing elements include an adhesive layer positioned between the battery enclosure 100 and the chassis or housing 166. In another example, the securing elements include solder or weld materials that assist in welding the battery enclosure 100 to the chassis or housing 166.

In another example, as depicted in FIGS. 1 and 2, the securing elements include at least one screw boss 168 and screw 170. The screw boss 168 may be positioned on and extend from a surface of the chassis or housing 166. A screw 170 may pass through a grommet or eyelet 172 attached to a surface of the battery enclosure 100 and screwed into the screw boss, thereby securing the battery enclosure 100 to the chassis or housing 166. In certain examples, the grommet 172 may be positioned on each corner or edge of the battery enclosure 100. The combination of grommets 172, screws 170, and screw bosses 168 is advantageous in allowing the battery enclosure 100 to be removably secured (i.e., attached and detached) to the chassis or housing 166. In other words, the battery enclosure 100 can be installed, removed, and replaced without damage to the chassis 166 or battery enclosure 100.

Figure 3:
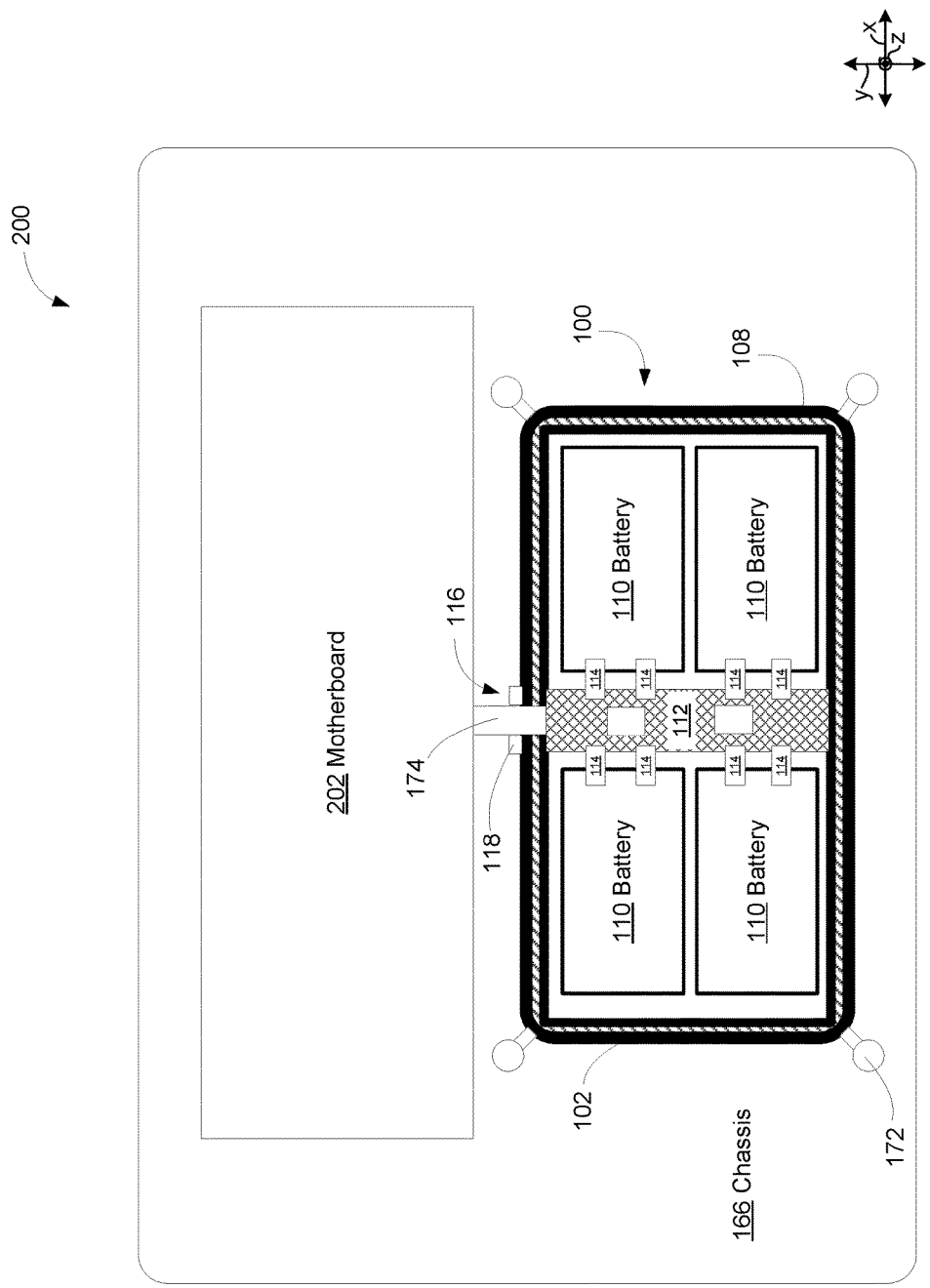
FIG. 3 depicts a top-down view of the battery enclosure of FIG. 1 or 2 secured within a chassis or housing of an electronic device.

FIG. 3 depicts a view of the battery enclosure of FIGS. 1 and 2 secured to a chassis or housing 166 of an electronic device 200. As noted above, the one or more batteries 110 may be attached to a protection circuit module 112 positioned within the enclosure 100 via one or more battery cell tabs 114. The protection circuit module 112 may be connected to a connector cable 174 that extends outside of the battery enclosure 100 via an opening 116 in the shell 102 of the battery enclosure 100. A seal 118 (e.g., a hermetic seal) may be positioned around the cable 174 extending through the opening 116 of the shell 102. The cable 174 may be connected to one or more components of the electronic device 200 to provide power to the one or more components. As depicted in FIG. 3, the cable 174 is connected to a motherboard 202 or printed circuit board.

Figure 4:
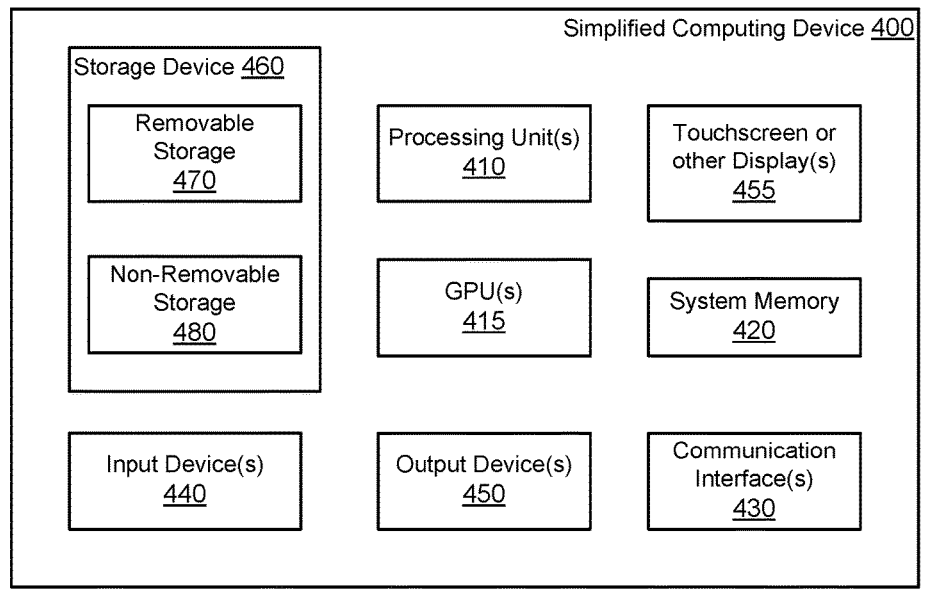
FIG. 4 is a block diagram of a computing environment in accordance with one example of a hybrid electronic device or a component of a hybrid electronic device described herein.

Regarding FIG. 4, the devices described above may be incorporated within an exemplary computing environment 400. The computing environment 400 may correspond with one of a wide variety of electronic or computing devices, including, but not limited to, personal computers (PCs), server computers, tablet and other handheld computing devices, laptop or mobile computers, communications devices such as mobile phones, multiprocessor systems, microprocessor-based systems, set top boxes, programmable consumer electronics, network PCs, minicomputers, mainframe computers, or audio or video media players. In certain examples, the computing device may be a wearable electronic device, wherein the device may be worn on or attached to a person's body or clothing. The wearable device may be attached to a person's shirt or jacket; worn on a person's wrist, ankle, waist, or head; or worn over their eyes or ears. Such wearable devices may include a watch, heart-rate monitor, activity tracker, or head-mounted display.

The computing environment 400 has sufficient computational capability and system memory to enable basic computational operations. In this example, the computing environment 400 includes one or more processing unit(s) 410, which may be individually or collectively referred to herein as a processor. The computing environment 400 may also include one or more graphics processing units (GPUs) 415. The processor 410 and/or the GPU 415 may include integrated memory and/or be in communication with system memory 420. The processor 410 and/or the GPU 415 may be a specialized microprocessor, such as a digital signal processor (DSP), a very long instruction word (VLIVV) processor, or other microcontroller, or may be a general-purpose central processing unit (CPU) having one or more processing cores. The processor 410, the GPU 415, the system memory 420, and/or any other components of the computing environment 400 may be packaged or otherwise integrated as a system on a chip (SoC), application-specific integrated circuit (ASIC), or other integrated circuit or system.

The computing environment 400 may also include other components, such as, for example, a communications interface 430. One or more computer input devices 440 (e.g., pointing devices, keyboards, audio input devices, video input devices, haptic input devices, or devices for receiving wired or wireless data transmissions) may be provided. The input devices 440 may include one or more touch-sensitive surfaces, such as track pads. Various output devices 450, including touchscreen or touch-sensitive display(s) 455, may also be provided. The output devices 450 may include a variety of different audio output devices, video output devices, and/or devices for transmitting wired or wireless data transmissions.

The computing environment 400 may also include a variety of computer readable media for storage of information such as computer-readable or computer-executable instructions, data structures, program modules, or other data. Computer readable media may be any available media accessible via storage devices 460 and includes both volatile and nonvolatile media, whether in removable storage 470 and/or non-removable storage 480. Computer readable media may include computer storage media and communication media. Computer storage media may include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which may be used to store the desired information and which may be accessed by the processing units of the computing environment 400.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

Claim Support Section

In a first embodiment, a battery enclosure, configured to be positioned within an electronic device, includes: a shell; a battery positioned within an internal volume of the shell; and a fire-retardant composition positioned on an outer surface of the shell, a first inner surface of the shell, between the first inner surface of the shell and the battery, or a combination thereof.

In a second embodiment, a battery enclosure, configured to be positioned within an electronic device, includes: a shell; a battery positioned within an internal volume of the shell; and a fire-retardant composition positioned within the internal volume of the shell, wherein the shell and the fire-retardant composition are configured to provide a thermal protection barrier between the battery and components of the electronic device positioned outside of the battery enclosure.

In a third embodiment, an electronic device includes: a housing; a motherboard positioned within the housing; and a battery enclosure positioned within the housing, wherein the battery enclosure includes: a shell having an outer surface, an inner surface, and an internal volume; an opening in the shell; and a battery positioned within the internal volume of the shell, wherein the battery is connected to the motherboard via a connector cable running through the opening in the shell, wherein the shell is configured to provide a thermal protection barrier between the battery and components of the electronic device positioned outside of the battery enclosure.

In a fourth embodiment, with reference to any of embodiments 1-3, the shell is a metal or metal alloy.

In a fifth embodiment, with reference to any of embodiments 1-4, the shell is configured to provide a thermal seal that restricts or eliminates a flow of heat from the internal volume of the shell to a volume of the electronic device located outside of the shell, restricts or eliminates a flow of heat from the volume of the electronic device located outside of the shell to the internal volume of the shell, or a combination thereof.

In a sixth embodiment, with reference to any of embodiments 1-5, the fire-retardant composition is positioned on the first inner surface of the shell.

In a seventh embodiment, with reference to any of embodiments 1-6, the fire-retardant composition is applied to the first inner surface of the shell as a paint layer.

In an eighth embodiment, with reference to any of embodiments 1-7, the battery enclosure further includes a first heat spreader having a first segment of the first heat spreader positioned adjacent to or abutting a first surface of the battery such that the first segment of the first heat spreader is positioned between the battery and the first inner surface of the shell.

In a ninth embodiment, with reference to the eighth embodiment, the battery enclosure further includes a second heat spreader positioned adjacent to or abutting a second, opposite surface of the battery.

In a tenth embodiment, with reference to the ninth embodiment, the battery enclosure further includes an air gap positioned between the second heat spreader and a second inner surface of the shell, the second inner surface positioned on an opposite surface from the first inner surface with the battery positioned between the first and second inner surfaces.

In an eleventh embodiment, with reference to the tenth embodiment, the battery enclosure further includes fire-retardant capsules positioned within the air gap, each fire-retardant capsule having a coating layer encapsulating an additional fire-retardant composition, wherein the coating layer is configured to melt at a temperature greater than 50° C. to release the additional fire-retardant composition positioned within the respective fire-retardant capsule.

In a twelfth embodiment, with reference to the eleventh embodiment, the fire-retardant capsules occupy 1-25 percent by volume of the air gap.

In a thirteenth embodiment, with reference to any of embodiments 1-12, the battery enclosure further includes at least one securing element positioned on the external surface of the shell, wherein the securing element is configured to couple or decouple the battery enclosure with an internal surface of the electronic device.

In a fourteenth embodiment, with reference to the thirteenth embodiment, the at least one securing element comprises a grommet.

In a fifteenth embodiment, with reference to any of embodiments 1-14, the battery enclosure further includes a thermistor configured to monitor a temperature of the battery enclosure; and a resistive heater integrated circuit configured to heat the battery enclosure when the temperature of the battery enclosure is less than a predefined value.

In a sixteenth embodiment, with reference to any of embodiments 3-15, the battery enclosure further includes a fire-retardant composition positioned on the outer surface of the shell, the inner surface of the shell, between the inner surface of the shell and the battery, or a combination thereof.

In a seventeenth embodiment, with reference to any of embodiments 1-16, the battery enclosure further includes a hermetic seal positioned around the opening of the shell.

What is claimed is:

1. A battery enclosure configured to be positioned within an electronic device, the battery enclosure comprising:
a shell;
a battery positioned within an internal volume of the shell; and
a paint layer comprising a fire-retardant composition, wherein the paint layer is positioned on a first inner surface of the shell.

2. The battery enclosure of claim 1, wherein the shell is a metal or metal alloy.

3. The battery enclosure of claim 1, wherein the shell is configured to provide a thermal seal that restricts or eliminates a flow of heat from the internal volume of the shell to a volume of the electronic device located outside of the shell, restricts or eliminates a flow of heat from the volume of the electronic device located outside of the shell to the internal volume of the shell, or a combination thereof.

4. A battery enclosure configured to be positioned within an electronic device, the battery enclosure comprising:
a shell;
a battery positioned within an internal volume of the shell;
a fire-retardant composition positioned on an outer surface of the shell, a first inner surface of the shell, between the first inner surface of the shell and the battery, or a combination thereof; and
a first heat spreader having a first segment of the first heat spreader positioned adjacent to or abutting a first surface of the battery such that the first segment of the first heat spreader is positioned between the battery and the first inner surface of the shell.

5. The battery enclosure of claim 4, further comprising:
a second heat spreader positioned adjacent to or abutting a second, opposite surface of the battery.

6. The battery enclosure of claim 5, further comprising:
an air gap positioned between the second heat spreader and a second inner surface of the shell, the second inner surface positioned on an opposite surface from the first inner surface with the battery positioned between the first and second inner surfaces.

7. The battery enclosure of claim 6, further comprising:
fire-retardant capsules positioned within the air gap, each fire-retardant capsule having a coating layer encapsulating an additional fire-retardant composition,
wherein the coating layer is configured to melt at a temperature greater than 50° C. to release the additional fire-retardant composition positioned within the respective fire-retardant capsule.

8. The battery enclosure of claim 7, wherein the fire-retardant capsules occupy 1-25 percent by volume of the air gap.

9. A battery enclosure configured to be positioned within an electronic device, the battery enclosure comprising:
- a shell;
- a battery positioned within an internal volume of the shell;
- a fire-retardant composition positioned on an outer surface of the shell, a first inner surface of the shell, between the first inner surface of the shell and the battery, or a combination thereof; and
- at least one securing element positioned on the external surface of the shell, wherein the securing element is configured to couple or decouple the battery enclosure with an internal surface of the electronic device.

10. The battery enclosure of claim 9, wherein the at least one securing element comprises a grommet.

11. A battery enclosure configured to be positioned within an electronic device, the battery enclosure comprising:
- a shell;
- a battery positioned within an internal volume of the shell;
- a fire-retardant composition positioned on an outer surface of the shell, a first inner surface of the shell, between the first inner surface of the shell and the battery, or a combination thereof;
- a thermistor configured to monitor a temperature of the battery enclosure; and
- a resistive heater integrated circuit configured to heat the battery enclosure when the temperature of the battery enclosure is less than a predefined value.

12. An electronic device comprising:
- a housing;
- a motherboard positioned within the housing; and
- a battery enclosure positioned within the housing, wherein the battery enclosure comprises:
  - a shell having an outer surface, an inner surface, and an internal volume;
  - an opening in the shell; and
  - a battery positioned within the internal volume of the shell, wherein the battery is connected to the motherboard via a connector cable running through the opening in the shell,
- wherein the shell is configured to provide a thermal protection barrier between the battery and components of the electronic device positioned outside of the battery enclosure.

13. The electronic device of claim 12, wherein the battery enclosure further comprises a fire-retardant composition positioned on the outer surface of the shell, the inner surface of the shell, between the inner surface of the shell and the battery, or a combination thereof.

14. The electronic device of claim 12, wherein the battery enclosure further comprises a hermetic seal positioned around the opening of the shell.

15. The electronic device of claim 12, wherein the battery enclosure further comprises at least one securing element positioned on the external surface of the shell, wherein the securing element is configured to attach or detach the battery enclosure with an internal surface of the electronic device.

16. A battery enclosure configured to be positioned within an electronic device, the battery enclosure comprising:
- a shell;
- a battery positioned within an internal volume of the shell; and
- a fire-retardant composition positioned within the internal volume of the shell,
- wherein the shell and the fire-retardant composition are configured to provide a thermal protection barrier between the battery and components of the electronic device positioned outside of the battery enclosure,
- wherein the fire-retardant composition is encapsulated within a fire-retardant capsule positioned within the battery enclosure and external of the battery, the fire-retardant capsule having a coating layer encapsulating the fire-retardant composition, and
- wherein the coating layer is configured to melt at a temperature greater than 50° C. to release the fire-retardant composition positioned within the respective fire-retardant capsule.

17. The battery enclosure of claim 16, wherein the battery enclosure further comprises:
- a first heat spreader having a first segment of the first heat spreader positioned adjacent to or abutting a first surface of the battery such that the first segment of the first heat spreader is positioned between the battery and the inner surface of the shell;
- a second heat spreader positioned adjacent to or abutting a second, opposite surface of the battery; and
- an air gap positioned between the second heat spreader and a second segment of the first heat spreader.

* * * * *